United States Patent [19]

Peck, Jr.

[11] Patent Number: 5,894,534
[45] Date of Patent: Apr. 13, 1999

[54] FIBER OPTIC "T" COUPLER SINGLE PATH TRANSCEIVER

[75] Inventor: James L. Peck, Jr., Huntington Beach, Calif.

[73] Assignee: Boeing North American, Inc., Seal Beach, Calif.

[21] Appl. No.: 08/842,310

[22] Filed: Apr. 24, 1997

[51] Int. Cl.[6] .................................................. G02B 6/26
[52] U.S. Cl. ............................... 385/44; 385/633; 385/34
[58] Field of Search ................................ 385/31, 33, 34, 385/44, 45, 16; 359/636

[56] References Cited

U.S. PATENT DOCUMENTS

| | | | |
|---|---|---|---|
| 4,873,697 | 10/1989 | Haeussler et al. | 385/33 |
| 5,159,190 | 10/1992 | Hohberg et al. | 385/16 |
| 5,757,994 | 5/1998 | Schoenwald et al. | 385/44 |

*Primary Examiner*—Hemang Sanghavi
*Attorney, Agent, or Firm*—Harry B. Field; Steven E. Kahm

[57] ABSTRACT

A fiber optical "T" coupler for sending and receiving signals on the same fiber optic element to facilitate ease of building and operating fiber optic communications networks. The fiber optical "T" coupler has three GRIN lenses, a receiving GRIN lens, a transmitting GRIN lens and a focusing GRIN lens, each having a focusing end and a collimating end. The transmitting GRIN lens' and the focusing GRIN lens' collimating ends are attached to and optically connected to the collimating end of the receiving GRIN lens. Fiber optic elements can be connected to the GRIN lenses focused ends for receiving signals to be collimated or for sending focused signals from the collimated end of the GRINs. Thus a light emitting transducer sends light to the transmitting GRIN lens and through the receiving GRIN lens to a fiber optic element. The same fiber optic element brings light to the receiving GRIN lens which is optically connected to the focusing GRIN lens which focuses the light on a light detecting transducer.

6 Claims, 1 Drawing Sheet

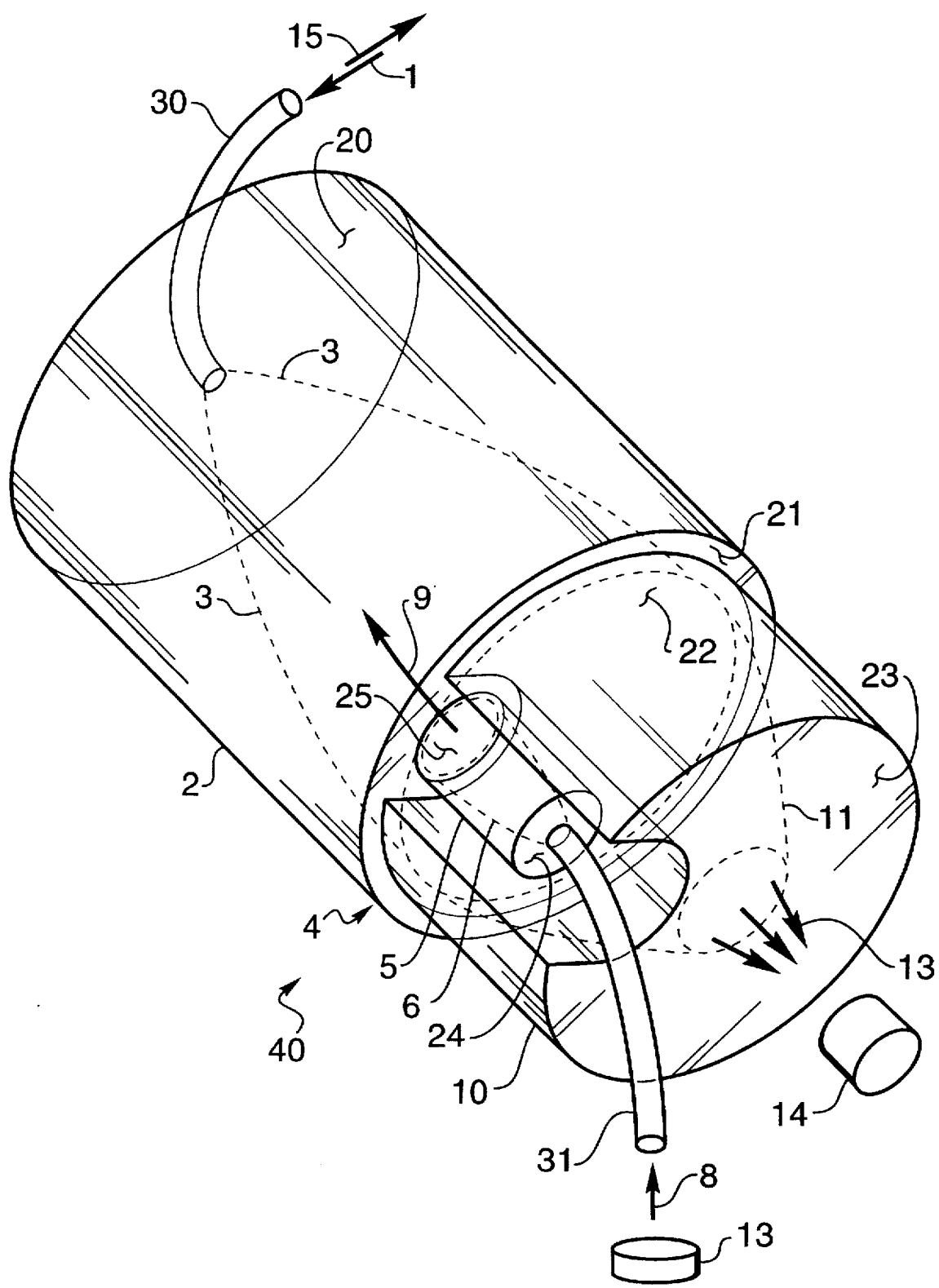

FIBER OPTIC "T" COUPLER SINGLE PATH TRANSCEIVER

BACKGROUND OF THE INVENTION

1. Field of the Invention

This invention relates to couplers for fiber optic communications, and more particularly couplers for two way communications on the same fiber optic cable.

2. Description of the Related Art

In the past fiber optic cables were used to transmit energy in only one direction. Separate transmitters and receivers were used on different fiber optic cables for two way communication.

SUMMARY OF THE INVENTION

This device separates the receiver information and the transmitted information in the same fiber optic cable. Three GRIN lens having focusing ends and collimated ends are employed to make the fiber optic "T" coupler. The collimated ends of two of the GRINs are optically connected to the collimated end of the third GRIN. The focused end of the GRINs can be attached to fiber optic elements for the transmission of light or to light creating or light detecting transducers.

OBJECTS OF THE INVENTION

It is an object of the invention to provide an optical "T" coupler for sending and receiving signals on a single fiber optic element.

It is also an object of the invention to provide for a high efficiency transfer of light energy through the optical "T" coupler to the desired branch.

It is a further object of the invention to provide a low cost optical "T" coupler.

Other objects, advantages and novel features of the present invention will become apparent from the following detailed description of the invention when considered in conjunction with the accompanying drawing.

BRIEF DESCRIPTION OF THE DRAWING

The figure is a perspective view of the fiber optic "T" coupler single path transceiver.

DETAILED DESCRIPTION OF THE PREFERRED EMBODIMENT

The fiber optic "T" coupler single path transceiver comprises three basic elements a receiving GRIN lens 2, a transmitting GRIN lens 5 and a focusing GRIN lens 10.

Incoming optical energy 1, delivered by optical cable 30, arrives at the focused end 20 of receiving GRIN lens 2, at its focal center as shown by propagation envelope 3. The receiving GRIN lens 2 is preferably a quarter wave length GRIN lens so as to receive a point source of light at the focused end 20 and transmit a collimated beam at the collimated end 21 as shown by propagation envelope 3. It should be noted that the reverse flow of light through the same GRIN lens 2 receives a collimated beam 9 at the collimated end 21 of the receiving GRIN lens 2 and transmits a focused beam 15 at the focused end 20.

There is a quarter wave length interface 4 between the collimated end 21 of receiving GRIN lens 2, and adjacent collimated end 25 of transmitting GRIN lens 5. There is also a quarter wave length interface 4 between the collimated end 21 of receiving GRIN lens 2 and the collimated end 22 of focusing GRIN lens 10. The lenses are attached to each other by well known means in the art such as by optical adhesives.

The collimated end 21 of receiving GRIN lens 2 transmits collimated light through the quarter wave length interface 4, to the collimated end 22 of focusing GRIN lens 10, and to the collimated end 25 of transmitting GRIN lens 5.

The light entering the collimated end 22 of focusing GRIN lens 10 is focused as shown by propagation envelope 11. The light 13 exits focusing GRIN lens 10 at focused end 23 and is incident on detection element 14 which may be a light energy receiver such as a detector which changes impedance relative to the energy received. Such a fiber optic data receiver transduces the light energy received into electrical data for many applications.

A return signal generated by a transducer 13 sends light 8, delivered by optical cable 31, entering the focused end 24 of transmitting GRIN lens 5 and is collimated as shown by propagation envelope 6. Collimated light 9 exits the transmitting GRIN lens 5 at collimated end 25, travels through the quarter wave length interface 4 and enters the collimating end 21 of receiving GRIN lens 2. Light 9 travels through receiving GRIN lens 2 along a path shown by propagation envelope 3 to exit at focused end 20 as light 15 on optical element 30.

Alternatively the transducer 13 could be attached directly to the focused end of 24 of GRIN lens 5, eliminating optical cable 31.

Thus a signal 1 coming into the coupler 40 on optical cable 30 can have a return signal 15 from the coupler 40 sent down optical cable 30.

It should be noted that the relative size of the interface collimated surface 21 of the receiving GRIN lens 2 is almost the same size as collimated surface 22 of focusing GRIN lens 10 so that a large percentage of the light exiting collimated surface 21 is incident on collimated surface 22 of focusing GRIN lens 10 and is then focused as shown by propagation envelope 11 on detection element 14. Alternatively an optic cable (not shown) can connect the detection element 14 to the focused end 23 of GRIN lens 10.

The transmitting GRIN lens 5 has a collimated end 25 which is small compared to the surface of the collimated end 21 of receiving GRIN lens 2. Therefore the transmitting GRIN lens 5 does not interfere much with the light exiting receiving GRIN lens 2 yet all of the light exiting the transmitting GRIN lens 5 at collimating end 25 enters the collimated end 21 of receiving GRIN lens 2 for focusing on focused end 20 and transmission of light 15 on optical cable 30.

The light from the receiving GRIN lens 2 exiting collimated end 21 falling on the collimated end 25 of transmitting GRIN lens 5 is not acted on and does not interfere with the light generation device which sends light 8 to the transmitting GRIN lens 5.

Although the transmitting GRIN lens 5 is shown as a small insert in the side of the focusing GRIN lens 10 any means of providing both of these GRIN lenses an optical connection to the receiving GRIN lens 2 will be functional.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A fiber optic "T" coupler comprising:

a first GRIN lens having a focused end and a collimated end, a second GRIN lens having a focused end and a collimated end, with the collimated end of the second GRIN lens optically coupled to the collimated end of the first GRIN lens, a third GRIN lens having a focused end and a collimated end, with the collimated end of the third GRIN lens optically coupled to the collimated end of the first GRIN lens and not optically coupled to the collimated end of the second GRIN lens, such that the first GRIN lens transfers light primarily to the second GRIN lens and receives light from the third GRIN lens.

2. A fiber optic "T" coupler as in claim 1 wherein, an optic cable is connected to the focused end of the first GRIN lens to guide light signals to and from the fiber optic "T" coupler.

3. A fiber optic "T" coupler as in claim 1 wherein, the focused end of the second GRIN lens is optically connected to a light detection element, which acts as a transducer for receiving light signals.

4. A fiber optic "T" coupler as in claim 1 wherein, the focused end of the third GRIN lens is optically connected to a light producing element which acts as a transducer for sending light signals.

5. A fiber optic "T" coupler as in claim 1 wherein, the second GRIN lens is substantially the same size as the first GRIN lens.

6. A fiber optic "T" coupler as in claim 1 wherein, the second GRIN lens is larger than the third GRIN lens.

* * * * *